Patented Jan. 7, 1941

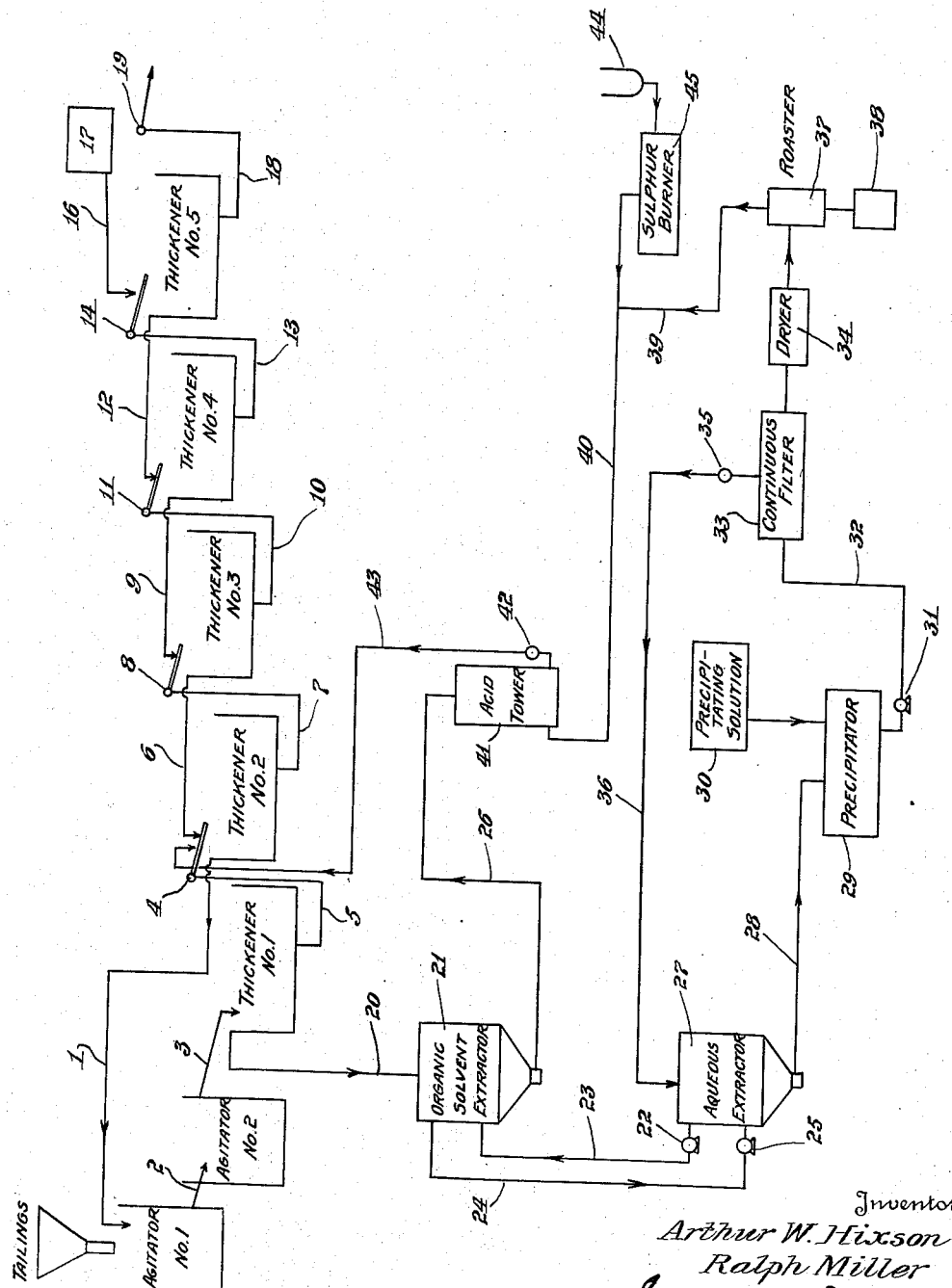

2,227,833

UNITED STATES PATENT OFFICE 2,227,833

METHOD OF SELECTIVE EXTRACTION OF METAL VALUES

Arthur W. Hixson, Leonia, N. J., and Ralph Miller, New York, N. Y., assignors to The Chemical Foundation, Incorporated, a corporation of Delaware Application December 24, 1937, Serial No. 181,594

12 Claims. (Cl. 23—23)

This invention relates to a method of selective extraction of metal values, more particularly to a method of using organic selective solvents for the recovery of metal values from their compounds by three interrelated extraction cycles.

The present application is a continuation in part of our prior application Serial No. 154,188, filed July 17, 1937, now Patent No. 2,211,119 issued Aug. 13, 1940, and application Serial No. 163,958, filed September 15, 1937, now Patent No. 2,202,525, issued May 28, 1940.

As described in the earlier applications, we have found that it is possible, and eminently feasible, to extract metal values from aqueous systems containing such values, by utilizing the principle of selective solubility of the metal value in organic solvents.

We have now found that such a method may be utilized in a cyclic and regenerative process in which these selective organic solvents may be continuously recycled and, as it were, in epicylic relationship, to a recycled aqueous phase, which latter functions continuously to extract the metal value from the organic solvent phase. In these circumstances, as will be appreciated, since the organic solvent is employed cyclically and continuously, and since it is not subjected to recurrent distillations, or other treatments involving substantial losses, the quantity of this expensive extractant which is needed in the process is reduced to the minimum.

As will more fully appear, the present process in its complete operation involves three interrelated cycles. In the first cycle, which may, for the sake of a term, be called the aqueous solubilizing cycle, the ore or compound which contains the metal to be recovered is leached or otherwise contacted with an aqueous solution of a suitable dissolving agent such as a mineral acid. In this cycle, the metal value is dissolved and taken up in this first aqueous phase. In the second cycle the first aqueous phase or solution, which now contains the dissolved metal, is contacted with a hydrophobic organic solvent, which has a preferential affinity for the dissolved metal value and which then selectively extracts it from its original aqueous vehicle. The first or original aqueous extractant, now freed from the metal, is recycled for additional and continued extraction of metal value from the source material. In the third cycle, paradoxically, the organic solvent with its contained metal value is contacted with a separate aqueous solution under such circumstances that the metal value is preferentially extracted by this aqueous phase. The de-metallized organic solvent is then recycled for further contact with the original (acidic) aqueous extractant. In these circumstances, the original metal value is concentrated in and is ultimately recovered from an aqueous phase. As the organic solvent is employed only in the intermediate cycle and not in the final recovery cycle, it is not subjected to the losses usually incident to solvent recovery systems. Since the liquids which are contacted in the sequential recovery stages are respectively immiscible, practically a quantitative recovery of the separate liquid phases is insured.

In brief then, the treatment involves three closely correlated cycles. In the first cycle, the metal value is dissolved in an aqueous vehicle. During the cyclic flow of this first solution, the metal value is transferred, by direct contact, to a selective organic solvent and the stripped aqueous solvent is returned for further extraction of the metal value. In the second cycle, the metal-containing organic solvent is contacted with a separate aqueous phase which serves to preferentially extract the metal value. The stripped organic solvent returns, cyclically, to extract further amounts of metal value from the first extractant or cycle. In the final or water cycle, the solution may be subjected to any suitable treatment by reason of which the metal values are concentrated or are converted to another form such as to a water insoluble compound by reason of which they are precipitated from the water extractant. In these circumstances, the water extractant may be returned in a cyclic flow for further contact with the organic solvent operating in the intermediate cycle.

The operation of such a novel extraction system will be more readily appreciated from a consideration of a specific process in which these principles are utilized. To more clearly explain the principles involved, there is shown in the accompanying drawing a flow sheet of a process for the recovery of molybdenum from molybdenum-containing compounds. As will more fully appear, the invention is not limited to the extraction of this particular metal value, but may be utilized for the recovery of a number of other specifically different metals.

As has been explained in copending application Serial No. 163,598, it is possible to extract molybdenum from aqueous systems containing it by means of suitable selective solvents. In such prior application a method of treating oxidized ore (molybdite) was described, which method involved the leaching of the ore with a suitable acid, such as sulphurous acid, to dissolve the oxide, followed by reduction of the metal component to a low valence state and its extraction with organic solvents.

According to the present improvement, the principle of solvent extraction may be utilized in an economic cycle process to extract molybdenum from sulphide ores as well as to extract other valuable metals such as vanadium, tungsten, uranium, rhenium, titanium, lithium, and the like, from ores or compounds containing them.

As is known, a large part of the molybdenum that is present in the earth's crust occurs as the sulphide. The molybdenum-bearing ores are relatively poor, carrying only about 1 per cent. of the mineral. For the most part, the sulphide mineral (molybdenite) may be concentrated by flotation so as to produce a concentrate carrying 80 to 90 per cent. of molybdenum sulphide. However, there are some cases, as for example with certain molybdenite deposits in South Norway, where it is not possible to concentrate by flotation. In these circumstances, the method of recovering the molybdenum is quite expensive, involving preliminary roasting and the use of expensive alkali or acid leaches. Yet again, in certain places, especially at the Climax Mine, Colorado, molybdenite and molybdite occur in the same ore. These two minerals may be separated by flotation, the sulphide being recovered as a concentrate and the oxide in the tailings. Under the present invention, ores such as the molybdenite of South Norway and the molybdite tailings may be treated to extract and recover the molybdenum content. In operations involving a mixed molybdite and molybdenite ore, a quantity of the concentrated molybdenite may be roasted to produce sulphur dioxide for the production of sulphurous acid, which latter constitutes the original solvent or dissolving agent for the molybdenum oxide.

The operations of such a process will be more readily appreciated from a consideration of a specific treatment as indicated in the accompanying flow sheet. While this flow sheet is developed particularly for the treatment of molybdenum, it will be understood that the broad concept may be utilized for the recovery of the other metal values mentioned. In other words, this same general type of treatment may be used for the recovery of other metal values by choosing a suitable aqueous solvent for the first or aqueous phase.

As shown in the flow sheet, the starting material, which may consist of tailings, concentrated ore, and the like, is fed from a hopper to the agitator #1. In this agitator the ore or compound is contacted with the dissolving agent, specifically sulphurous acid, which is fed to the first agitator through line 1. The ore pulp, as shown, overflows from agitator #1 through line 2 to agitator #2. In this vessel the ore pulp is agitated so as to insure further dissolution of the metal values by the acid. The material from agitator #2 overflows through line 3 into a counter-current washing system, illustrated as a typical Dorr continuous counter-current decantation system. The solids settled in thickener No. 1 are picked up by a suitable pump such as a Dorrco pump 4 and forced through line 5 into thickener No. 2. In thickener No. 2 the pulp or solids are repuddled with the overflow from thickener No. 3, coming in through line 6. Similarly, the pulp or sludge from thickener No. 2 passes through line 7 and pump 8 to thickener No. 3 and is there repuddled with the overflow of thickener No. 4, coming in through line 9. This treatment is continued for a number of steps, depending upon the ore to be treated, the strength of the solution, and the like. The slurry from thickener No. 3 is forced through line 10 by the pump 11 and discharged into thickener No. 4 where it is repuddled with the overflow from thickener No. 5, admitted through line 12. Continuing the cycle, the solids from thickener No. 4 are forced through line 13 by pump 14 into the final thickener No. 5, and is there repuddled with the fresh wash water admitted through line 16 from container 17. The sludge from the final thickener No. 5 is forced through line 18 by pump 19 and is discharged to the dump or to a calciner for further treatment in the event that there are secondary values which are desired to be recovered.

In the course of this treatment, as will be appreciated, the acidic solution is continuously enriched in the desired metal value in its counter-current passage in contact with the metal-bearing materials. The enriched liquid, in the particular case the sulphurous acid solution containing the dissolved metal, is overflowed or otherwise withdrawn from thickener No. 1 and passed through line 20 to the organic solvent extractor 21. As explained, in this vessel the sulphurous acid solution containing the dissolved metal is contacted with a suitable immiscible organic solvent, such that the metal values are selectively removed or extracted from the acid solution and are taken up in the organic solvent. The organic solvent may be forced into the organic solvent extractor by means of pump 22 and line 23 and, after contact with the aqueous acid phase and extraction of the metal values is withdrawn through the line 24 and pump 25.

The aqueous acid solution which has been stripped in the extractor 21 is passed through line 26 to the top of an acid recovery tower in which it is fortified in the manner more particularly to be described.

The organic solvent which has been enriched in the metal value, as noted, is withdrawn through line 24 and forced, as by means of pump 25, into the aqueous extractor 27. In this vessel the organic liquid is contacted with water flowing through line 36. In the manner explained, the aqueous phase, upon contact with the metal-bearing organic solvent phase, selectively extracts the metal therefrom. The metal enriched water wash is withdrawn from the aqueous extractor through the line 28, while the stripped organic solution is recycled through line 23 back to extractor 21.

The water phase containing the extracted metal values and which passes through line 28 may be treated in any suitable manner so as to directly recover the combined metal values or to convert them to any desired recoverable form. For example, if desired, this water solution may be concentrated to dryness, by evaporation, and the metal values recovered. In the preferred form of the invention, however, the final water wash is employed cyclically. For this purpose the metal-containing water phase is passed through the line 28 to a precipitator 29. In the precipitator the solution is contacted with a precipitating agent or solution which may be made up in tank 30. In the extraction of molybdenum, the tank 30 preferably contains a sodium sulphide solution. When such solution contacts with the water extract in the precipitator, the corresponding insoluble molybdenum sulphide is formed. The water pulp or slurry containing the molybdenum sulphide is then forced, as for example by a Dorrco pump 31, through the line 32 to a continuous filter 33, such for example as a De Laval or similarly efficient centrifuge. In this element, the water is separated from the precipitated sulphide. The solids are passed from the filter to a dryer 34 while the aqueous filtrate is recycled, by means of pump 35 and line 36, back to the aqueous extractor 27 to be re-employed for further contact with, and extraction of metal values from, the organic solvent.

The formed molybdenum sulphide, after being dried in the dryer 34, may be passed to a roaster 37. In this element the molybdenum sulphide is heated to convert it to molybdenum trioxide, which may be withdrawn in any suitable manner and passed to storage 38. The sulphur dioxide formed during the roasting operation is withdrawn overhead through the line 39 and is passed through line 40 to the base of the acid tower 41.

In this tower the stripped aqueous acid solution, flowing in through line 26, contacts with and absorbs the upwardly flowing stream of sulphur dioxide. The enriched sulphurous acid solution is withdrawn from the base of the tower and forced by pump 42 through line 43 to thickener No. 2. In this thickener, the enriched acid contacts the partially extracted ore and dissolves an additional quantity of the metal. From here the enriched solution is passed through the line 2 to agitator #1, after which the previously described cycle is repeated.

In the operation of the process, since the organic solvent is employed cyclically and since it is not subjected to any distillation, the losses are of a very low order. In the first cycle, however, a certain amount of acid is consumed, as for example by reacting with other components of the ore. In order to insure replenishment of this acid solution, a separate source of sulphur dioxide may be provided. As shown in the flow sheet, sulphur may be passed from a bin, not shown, to the melting pot 44 and thence to the burner 45, in which conditions are controlled, in a manner well known to those skilled in the art, to insure the formation of sulphur dioxide with minimal conversion to the trioxide. The sulphur dioxide thus formed may be passed through line 40 to the acid tower 41.

Where the described system is employed for the treatment of mixed molybdenite and molybdite ore, some or all of the sulphur dioxide employed for replenishing the acid solution may be obtained from the molybdenum sulphide concentrate. In this event, molybdenite concentrate may be admitted to the roaster 37 and there roasted, together with the extracted molybdenum sulphide. The molybdenite concentrate is thus converted to molybdenum trioxide and to sulphur dioxide, the latter being recovered and employed in the extraction process in the manner described.

It will be observed that in this type of operation three cyclic extractants are intimately correlated in the manner previously described. The aqueous extractant, after dissolving a metal value in the system, gives up such value to the organic solvent extractant, after which the aqueous phase is recycled back to the thickener for further extraction. The organic solvent, as explained, flows in a cyclic path, and in separate portions of that path or cycle extracts metal values from the acid aqueous system and gives up or transfers such values to another aqueous phase. The final water extractant similarly flows in a cyclic path in a portion of which path it extracts the metal values from the organic extractant and in another portion of which it deposits or discharges such values.

It is also to be observed that this method of utilizing the three cycles as respective transfer agencies presents other advantages. Although the organic solvent has been defined as immiscible with the aqueous phases, it is a fact that a very small amount will tend to dissolve in the acid solution. With such a cyclic process, the acid solution soon becomes saturated with the organic solvent after contact therewith. When such acid is recycled, it will dissolve no more of the organic solvent, having already attained saturation, and solvent losses from this source are therefore maintained at a low and substantially fixed minimum. Similarly in the third cycle some small amount of solvent will tend to dissolve in the final water wash. However, since this water wash is also recycled, it quickly becomes saturated with the solvent and no further quantity of solvent is thereafter removed.

It will be appreciated that this broad type of extractant may be employed for the recovery of other metal values by analogous and properly adjusted methods. As explained in the copending application Serial No. 163,958, the essential features or steps involved in the extraction of the molybdenum from, say, molybdenum oxide, are: the dissolution of the molybdenum in a suitable acid; the reduction of the dissolved metal to a low valence state, i. e. to a potentially extractable condition, and extraction of the reduced metal value by an organic selective solvent. In the process described herein, it will be appreciated that, in a sense, the sulphurous acid acts in a dual capacity, being at one time a dissolving acid and a reducing agent. It is thus particularly to be observed that the present process is not limited to use with the specific acid described. Molybdenum may be extracted by other specifically different methods, as for example, by dissolving the metal value in an acid and then, by the addition of a suitable reducing agent, reducing the metal value to a lower valence state and then extracting in the manner described.

As intimated, the present system is generally applicable to the recovery of metals which in some particular valence state are amenable to selective extraction by organic solvents. As has been explained in copending application Serial No. 154,188, vanadium may be extracted by invoking the same general principle. As there explained, vanadium may be substantially quantitatively recovered from suitable acid solutions, such as phosphoric acid solutions, by converting the vanadium to a higher valence state (i. e., its potentially extractable state) and then extracting with a suitable organic solvent, such as isopropyl ether. As will readily be appreciated, the type of cyclic process herein described, with minor adjustments, may be utilized for the recovery of vanadium values, as for example by effecting oxidation of the vanadium in the acid solution prior to its contact with the organic solvent.

Again, as explained in prior application Serial No. 154,188, it is possible to quantitatively and selectively extract a metal value from a system containing plural metal values by a controlled change in valence of one of such values so as to render it potentially and selectively extractable by the organic solvent. A case in point is that described in such earlier application, namely, the organic solvent fractional extraction of iron from iron-vanadium containing systems. In this particular instance, as was explained, the iron may be selectively extracted, by isopropyl ether, for example, by converting the iron in the system to the ferric state and the vanadium to the tetravalent state. Iron and titanium may be substantially quantitatively separated and recovered in a similar manner.

By analogous methods, other valuable metals, such as tungsten and rhenium, may be recovered by leaching or otherwise treating the compounds with a suitable acid, modifying the valence of the metal to render it potentially extractable and then contacting it with a selective organic solvent. The selective organic solvent phase containing the metal value may then be contacted with aqueous solutions in the manner described herein to transfer such metal value to the aqueous solution, after which it may be treated in any desired manner to recover the metal value in any particular form.

Uranium may substantially quantitatively be recovered from its ores or compounds in a similar manner, as for example, by dissolving the uranium in a suitable acid, such as nitric acid, and contacting this acid phase with a suitable organic solvent which has a preferential affinity for the metal value, and then extracting the metal value from the organic solvent with an aqueous extractant.

As will be appreciated, such factors as the particular solvent employed, the quantitative ratio of the solvent to acid, on the one hand, and the final water wash on the other, the temperature of extraction, and the distribution coefficient of the metal value in a particular extraction step, may be adjusted to the optimum conditions, depending upon the particular metal value which is to be extracted.

As explained in the earlier applications, a relatively wide range of solvents are available for employment. For example, in the extraction of molybdenum, as pointed out in copending application Serial No. 163,958, such solvent may be chosen from the group including aliphatic esters, dicarboxyl esters, aliphatic alcohols, aliphatic ethers, simple and mixed ketones, ketone condensation products, and the like.

It will be appreciated by those skilled in the art that a major desideratum in a selective solvent for the purposes herein stated is a marked affinity for the metal value which is to be extracted. This selective solubility differs with different solvents and depends upon the particular characteristics of the solvent, more especially upon the distribution coefficient of the metal value in the particular system in which the solvent is employed. Under the present system, as more fully explained in copending application Serial No. 154,188, the quantity of the metal which is extracted by a given solvent may be increased within limits by advantageously modifying the distribution ratio in the extraction system, as for example, by adjusting the hydrogen ion concentration of the system to the optimum value. Such distribution ratio may similarly be advantageously modified by utilizing suitable addition agents which tend to increase the concentration of the distributed substance, or metal value, in the solvent phase. These and similar modifications of one or more steps in the process may readily be made by those skilled in the art to insure the most efficient operation for the extraction of any given metal.

It will be further appreciated that this method of metal value recovery is of broad applicability. The wide range over which it may be applied can be illustrated by the fact that metals of various valences are extractable in the manner that has been described. Both tungsten and uranium are extracted in the hexavalent state; vanadium must be in the pentavalent state; molybdenum and rhenium in the tetravalent state, and iron in the trivalent state. All the principal commercial acids are used, depending upon the metal value to be extracted or the acid in which it happens to be in solution, because the recovery of the metal value is of a by-product nature. The best example is vanadium which may be extracted from hydrochloric acid solutions, but whose extraction from phosphoric acid, as explained in our aforesaid application Serial No. 154,188, is of great commercial interest. Molybdenum is extracted from a sulphurous sulphuric acid solution, although the presence of chloride ion is helpful. Tungsten and uranium are usually extracted from nitric acid solutions. Iron is extracted from hydrochloric acid solutions. Thus the valence of the metals extractable in this fashion vary from six to three. All the important mineral acids, sulphurous, sulphuric, nitric, hydrochloric, and phosphoric, may take part in the process. The number of solvents which may be employed for the selective extraction are legion. Typical examples may be noted from our co-pending applications before mentioned.

Another process which is a corollary of the epicyclic process described and depends upon the same broad principles, is the extraction of metal values from organic solvents by water. This process is particularly adaptable to the recovery of lithium from spodumene. Spodumene contains only a small percentage of lithia and all the processes that have been used up to this time have had to employ a tedious method for separating the lithium from the fluxes with which the ore had been treated to produce a water-soluble lithium compound. Such method is typical of many in which time, labor and reagent-consumption are handicaps to commercial exploitation. Lithium ores usually have been treated with potassium sulphate. A zeolitic reaction appears to take place in the solid phase forming some lithium sulphate. When the ore is then extracted with water, the lithium sulphate plus all the other soluble materials go into solution. A purification process must then be resorted to in order to separate the lithium from the other components of the solution.

By the use of organic selective solvents these expensive operations are obviated. The process consists of treating spodumene with a mixture of calcium carbonate or calcium oxide or both and a chloride, preferably calcium chloride, at elevated temperatures. Under these conditions lithium chloride is formed. The mass is allowed to cool and is then crushed and ground under anhydrous conditions. The powdered material is then extracted with an organic selective solvent for lithium chloride, which is immiscible with water; for example, amyl alcohol, butyl alcohol, or ethyl acetate. This treatment quantitatively extracts all the lithium chloride and leaves the other compounds in the solid phase. The organic solvent solution may then be distilled to recover the salt, but it is preferable to contact the organic solvent solution with water to extract the lithium chloride and then to recycle the organic solvent in order to dissolve an additional portion of lithium chloride. The advantages of this process are a saving in time, reagents, and labor, for no chemicals are consumed except the calcium compounds. It should be noted that the cheapness of the materials which are consumed renders the process economical. The most expensive chemical consumed is calcium chloride. A considerable excess is used. After the extraction of the powdered mass by the organic selective solvent is completed, the mass may be treated with water to recover the calcium chloride which was in excess.

Another important point concerning the process is the fact that the metal values that are recovered from solutions by means of organic solvents are in practically a pure state. In nearly every other case where chemical means are employed to recover metal values, the metal value is either separated from the other components of the solution by precipitation or the impurities are precipitated. When recourse is had to the first course, the precipitate often occludes or adsorbs some impurities. If the latter course is followed, some of the desired metal value is occluded when the impurities are precipitated. This decreases the yield. These considerations are particularly important in certain cases. For example, small amounts of impurities are very troublesome in titanium dioxide when it is used as a pigment. Tungsten must be especially purified when it is to be employed in filaments for incandescent light bulbs, since small amounts of impurities seriously affect lamp life. A third interesting example is the small amount of phosphorous that is tolerated in molybdenum compounds which are used to introduce molybdenum into steel. In each of these cases the use of organic selective solvents permits the economic attainment of results not obtainable by other methods now in use.

It will now be appreciated that the present disclosure provides an eminently simple and economic method of recovering metal values from a mixture of substances of which a compound of the metal in question is a component. Because of the epicyclic flow of the several extractants, the quantities of these, and particularly of the more expensive organic solvents, are maintained at a minimum, and, as previously explained, solvent losses are negligible. While preferred modifications of the invention have been described, it is to be understood that these are given to exemplify the underlying principles involved, and not as limiting the scope of the invention to the particular examples chosen for illustration.

Throughout the foregoing specification and in the appended claims, the phrase "recovering metal values from compounds thereof," is used as meaning the process whereby a metallic compound is recovered from a starting material composed of a plurality of compounds at least one of which is a compound of said metal.

We claim:

1. A method of recovering metal compounds from compounds thereof which comprises dissolving the metal compound in a suitable acid, modifying the valence of the metal to render a compound of the metal soluble in an organic solvent, while maintaining the metal in combination with the same elements present prior to the valence modification step; selectively extracting such metal compound from the acid solution with a substantially hydrophobic selective organic solvent, and then reextracting such metal compound from the organic solvent with water.

2. A method of recovering metal compounds from acid solutions containing such compounds which comprises modifying the valence of the metal to render a compound of the metal soluble in organic solvents, while maintaining the metal in combination with the same elements present prior to the valence modification step, selectively extracting such compound with a substantially hydrophobic selective organic solvent, separating the solvent from the acid solution, and contacting the separated solvent with water to preferentially extract the metal from the solvent phase.

3. A method of recovering metal compounds from compounds thereof which comprises dissolving the metal compound in a suitable inorganic solvent, modifying the valence of the metal to render a compound of the metal soluble in organic solvents, while maintaining the metal in combination with the same elements present prior to the valence modification step; selectively extracting the metal compound from such solvent with a suitable hydrophobic selective organic solvent, and then reextracting the metal compound from the organic solvent with water.

4. A method of recovering metal compounds from compounds thereof which comprises dissolving the metal compound in a suitable inorganic solvent, modifying the valence of the metal to render a compound of the metal soluble in organic solvents, while maintaining the metal in combination with the same elements present prior to the valence modification step, contacting such solvent with a substantially immiscible selective organic solvent to preferentially extract the metal compound; then contacting the organic solvent phase with water to preferentially extract the compound from the organic solvent phase.

5. A method of recovering metal values from compounds thereof which comprises circulating a mass of an aqueous inorganic solvent in a closed path and through a mass of the metal-containing compound, modifying the valence of the metal to render a compound of the metal soluble in organic solvents while maintaining the metal in combination with the same elements present prior to the valence modification step; circulating a substantially hydrophobic organic solvent which has a preferential affinity for the metal compound through a closed path, contacting the organic solvent in a section of such path with the metal-bearing inorganic solvent to selectively extract the dissolved metal compound therefrom, and contacting the organic solvent in another portion of its path with water to selectively extract the said metal compound from the said organic solvent.

6. A method of recovering metal values from compounds thereof which comprises establishing a quantity of the compound in a container; circulating a stream of an aqueous inorganic solvent through said container to dissolve metal compounds therefrom, modifying the valence of the metal to render a compound of the metal soluble in organic solvents while maintaining the metal in combination with the same elements present prior to the valence modification step; circulating a stream of a substantially hydrophobic organic solvent in a closed path, and contacting said stream in a portion of its path with said inorganic solvent to preferentially extract the metal compound therefrom.

7. A method of recovering metal values from compounds thereof which comprises establishing a quantity of the compound in a container; circulating a stream of an aqueous inorganic solvent through said container to dissolve the metal compound, modifying the valence of the metal to render a compound of the metal soluble in organic solvents while maintaining the metal in combination with the same elements present prior to the valence modification step; circulating a stream of a water-immiscible organic solvent in a closed path; contacting said organic solvent stream in a portion of its path with the said inorganic solvent to preferentially extract the metal compound from said inorganic solvent, and treating said stream of organic solvent in another portion of its path to remove such extracted metal compound.

8. A method of recovering metal values from compounds thereof which comprises establishing a quantity of the compound in a container, circulating a stream of an aqueous inorganic solvent through said container to dissolve the metal compound, modifying the valence of the metal to render a compound of the metal soluble in organic solvents while maintaining the metal in combination with the same elements present prior to the valence modification step; circulating a stream of a substantially water-immiscible selective organic solvent in a closed path; contacting said organic solvent stream in a portion of its path with the said inorganic solvent to preferentially extract the metal compound from the said inorganic solvent; and treating said stream of organic solvent in another portion of its path to remove such extracted metal compound; and recycling the organic solvent after such removal of the metal compound back to the said first portion of its path for contact with the said inorganic solvent.

9. In the solvent refining of metal values, that improvement which comprises continuously circulating a mineral acid in a closed path, contacting the acid in one portion of its path with a mass of metallic compound to dissolve a metal salt thereof, modifying the valence of the metal to render a compound of the metal soluble in organic solvents while maintaining the metal in combination with the same elements present prior to the valence modification step; continuously circulating a water-immiscible organic solvent which has a preferential affinity for such metal compound in a closed path, contacting such organic solvent with the mineral acid in a section of such closed path to thereby selectively extract such metal compound from the acid solution; and continuously circulating a stream of an aqueous solution in a closed path while contacting such aqueous solution with the organic solvent in a section of the latter's path to continuously extract the metal compound from the said organic solvent.

10. A method of recovering uranium values from compounds thereof which comprises dissolving the uranium compound in a suitable acid, modifying the valence of the uranium so that it is in the hexavalent state, to obtain a compound of uranium soluble in an organic solvent while maintaining the metal in combination with the same elements present prior to the valence modification step, and then extracting the uranium compound from the acid by contacting the acid solution with a substantially water-immiscible selective organic solvent.

11. A method of recovering rhenium values from compounds thereof which comprises dissolving the rhenium compound in a suitable acid, modifying the valence of the metal so that the rhenium is in the tetravalent state, while maintaining the metal in combination with the same elements present prior to the valence modification step and then extracting the rhenium value from the acid by contacting the acid solution with a water-immiscible selective organic solvent.

12. A method of recovering tungsten values from compounds thereof which comprises dissolving the tungsten compound in a suitable acid; modifying the valence of the metal so that the tungsten is in the hexavalent state, while maintaining the metal in combination with the same elements present prior to the valence modification step and then extracting the tungsten from the acid by contacting the acid solution with a water-immiscible organic solvent.

ARTHUR W. HIXSON.
RALPH MILLER.